July 15, 1958 J. MÜLLER 2,843,214
VEHICLE WHEEL SUSPENSION
Filed Feb. 28, 1956
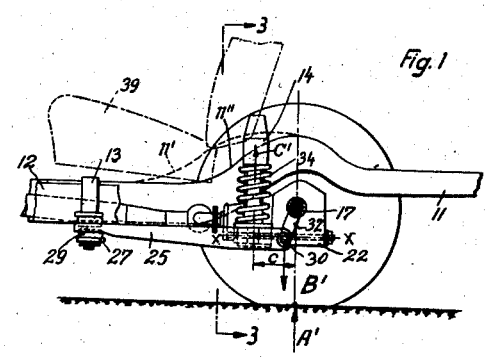
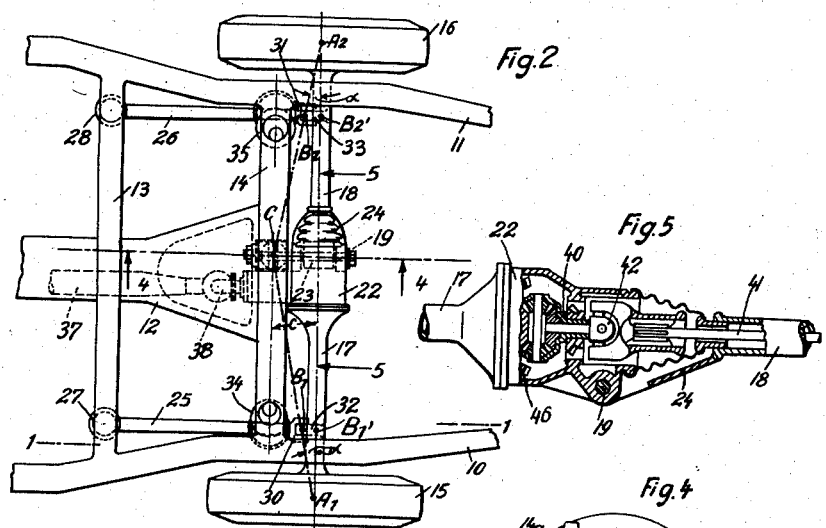
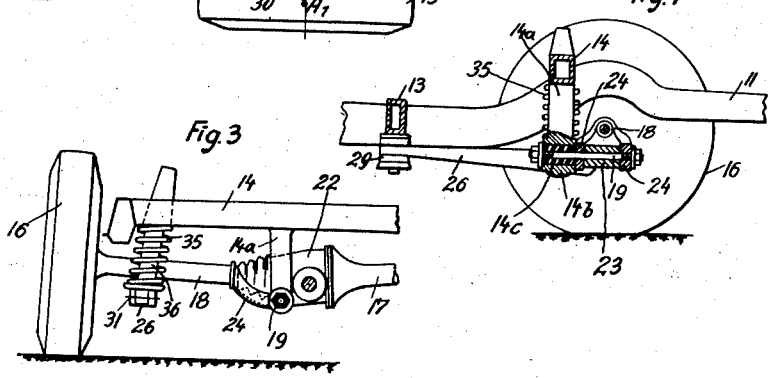
Inventor
JOSEF MÜLLER
BY Dicke and Craig
ATTORNEYS

United States Patent Office 2,843,214
Patented July 15, 1958

2,843,214

VEHICLE WHEEL SUSPENSION

Josef Müller, Stuttgart, Germany, assignor to Daimler-Benz Aktiengesellschaft, Stuttgart - Unterturkheim, Germany Application February 28, 1956, Serial No. 568,323

Claims priority, application Germany March 12, 1955

7 Claims. (Cl. 180—73)

My invention relates to a vehicle and, more particularly, to the wheel suspension thereof. More specifically, my invention is concerned with a vehicle of a type in which the wheels are journalled on half axles mounted on a bracket for oscillation about a substantially horizontal axis extending lengthwise of the vehicle, springing means being interposed between the body and each of the half axles.

It is an object of the present invention to so correlate the points of engagement between the springing means and the half axles and the point of location of the bracket as to avoid any torque from being set up which would act on the half axles and would tend to tilt the pivotal axis thereof. Such a torque is particularly liable to be set up where the bracket is mounted on the body of the vehicle at a point located in front of or behind the hall axles. It is desirable to include resilient rubber cushions in such mounting. Such rubber cushions, however, are subject to an undesirable deformation by the torque acting on the half axles causing to tilt the axis of oscillation, whereby the wheels would be turned out of the direction of travel with the undesirable result of an increased wear of the tires.

It is another object of the present invention to so relatively reorganize the body having lower lateral longitudinal frame members, the half axles and helical springs therefor that such frame members need not be given a curved shape above the springs, but may be disposed laterally of the springs thus permitting the seats to be disposed further rearwardly for greater riding comfort.

Further objects of my invention will appear from a detailed description of a preferred embodiment of my invention following hereinafter. It is to be understood, however, that the terms and phrases in such description have been chosen for the purpose of illustrating the invention rather than that of restricting or limiting the same. The features of novelty for which patent protection is sought are pointed out in the appended claims.

In the drawings,

Fig. 1 is a vertical longitudinal sectional view of the rear end of a motor car, the section being substantially taken along the line 1—1 of Fig. 2, Fig. 2 is a plan view of the rear end of the motor car shown in Fig. 1, Fig. 3 is a sectional view of the motor car, the section being taken along the line 3—3 of Fig. 1 viewed in the direction of the arrows shown in Fig. 1, Fig. 4 is a vertical section taken along a vertical plane on line 4—4 of Fig. 2, and Fig. 5 is a rear view of the inner ends of the half axles partly in section along the line 5—5 of Fig. 2.

The body of the motor-driven vehicle which may include a vehicle frame and may constitute a self-contained unit therewith, is provided with a pair of lower lateral longitudinal frame members 10, 11, with transverse frame members 13, 14 interconnecting the longitudinal frame members, and with a central beam 12 having rearwardly diverging side walls terminating at and welded to the transverse member 14. If desired, further transverse members may extend between the longitudinal members 10 and 11 to further reinforce the body unit.

The term "body" used hereinabove and in the claims is to be interpreted as applying to the entire aggregate composed of the frame members and of the superstructure carried thereby.

Between the frame members 10 and 11 there is provided a bracket 14a which is attached to the transverse member 14 and extends downwardly therefrom and forms an eye 14b in which the forward end of a substantially horizontal pivot pin 19 is so mounted as to extend lengthwise of the vehicle. A resilient bushing 14c is interposed between the eye 14b and the pin 19 for the purpose of mounting the same resiliently. A pair of half axles 17 and 18 is pivotally mounted for oscillation on the pivot pin 19 behind the bracket 14a. Each half axle is formed with a forwardly and downwardly extending projection 32 (Fig. 1). Wheels 15 and 16 are journalled on the half axles 17 and 18. For the purpose of bracing the half axles against longitudinal thrust a pair of guiding links 25 and 26 is provided, each link having its rear end pivotally connected to the projection 32 at a supporting point $B_1$, or $B_2$ respectively (Fig. 2). From this point, the link extends forwardly and has its forward end pivotally connected to the body, preferably to the transverse member 13 thereof, by joints 27 and 28 including rubber cushions 29 interposed between the end of the link 25, or 26 respectively, and the associated mounting means.

Helical springs 34 and 35 are interposed between the links 25, 26 and the body. Preferably, such springs are disposed adjacent to the opposed inside faces of the frame members 10 and 11 and bear against the transverse member 14 which may be a hollow sheet metal element.

In Fig. 2, $A_1$ and $A_2$ denote the centers of the wheels located substantially above the center of the area of contact of the wheels with the ground, whereas C denotes the center of the rubber bushing 14c. It will be noted that the bracket 14a and the extensions 32 are so correlated to the half axles 17 and 18 that the points $A_1$, $B_1$ and C are located in a common vertical plane and that, similarly, the points $A_2$, $B_2$ and C are located in a common vertical plane, each of such planes extending at an acute angle α to a vertical transverse plane of the vehicle. This is an important feature of the present invention which will be readily understood from a consideration of the conditions which would prevail if the springing means interposed between the body and the half axles and comprised, in the embodiment shown, of the links 25, 26 and of the associated helical springs 34, 35 would engage the half axles at supporting points $B_1'$ and $B_2'$ located in a vertical plane containing the axes of the half axles. In that event, the force C′ exerted in upward direction on the pin 19 by the rubber bushing 14c and resulting from the upwardly directed pressures A′ exerted by the ground on the wheels and the reactionary pressures acting downwardly on the axles at the supporting points $B_1'$ and $B_2'$, would exert a torque on the half axles acting on a lever arm of the length c in Fig. 2, such torque acting in clockwise direction with reference to Fig. 1 and tending to tilt the axis x—x of the pin 19. As the pin is resiliently held by the rubber bushing 14c, it would be tilted through a substantial angle causing the wheels to be turned out of the direction of travel. Such misalignment of the wheels with the direction of travel would result in an increased wear of the tires, however. By the disposition of the points $A_1$, $B_1$ and C in a common vertical plane and of the points $A_2$, $B_2$ and C in another vertical plane, no such torque will act on the half axles and the undesirable torques are thus eliminated.

Hence, it will appear that it is the purpose of the projections 32 which extend forwardly and downwardly to locate the supporting point B₂ forwardly of the vertical plane extending through the points A₂, B₂', B₁' and A₁.

Preferably, the axis $x—x$ of the pivot pin 19 of the half axles is spaced from and located beneath the axes of the wheels, as will appear from Fig. 3. In the embodiment shown, the half axle 17 includes a differential gear housing 22 which is formed with an eye 23 on pin 19. The inner end of the half axle 18 is bifurcated, the arms 24 of the bifurcation being formed with eyes mounted on pivot pin 19 on either side of the eye 23, as shown in Fig. 5. The half axles including the gear housing 22 encase suitable means connected to the wheels 15 and 16 for driving the same. In the embodiment shown, such means include shafts 40 and 41 disposed coaxially with respect to the half axles 17 and 18, and a universal joint 42 connecting the shafts 40 and 41 and located substantially above the horizontal axis of oscillation of the half axles, i. e. above the pivot pin 19. The universal joint 42 includes a member fixed to shaft 40 and a member splined on shaft 41 for lengthwise displacement but common rotation.

The differential gearing in the housing 22 comprises a bevel gear fixed to shaft 40, an opposed bevel gear connected to wheel 15 by a suitable shaft (not shown) journalled in the half axle 17, and a plurality of planetary gears meshing with the bevel gears and carried by a suitable bracket fixed to a bevel gear 46 meshing with a suitable pinion driven by a universal shaft 37 through a universal joint 38 (Fig. 2). Preferably, the connection between the links 25, 26 and the projections 32 of the half axles is effected by hinges 30 and 31 including horizontal pivot pins extending substantially parallel to the half axles, rubber cushions being preferably inserted between the cooperating elements of such hinges.

It will be noted from Fig. 1 that the longitudinal frame members 10 and 11 are curved upwardly above the half axles. Owing to the disposition of the helical springs 34 and 35 adjacent to the opposed inside faces of the frame members 10 and 11, the curved portion of such frame members may be disposed further rearwardly than it could be done otherwise. By a dotted line 11' in Fig. 1 I have indicated the disposition of the curved portions of the longitudinal frame members in a prior design where the helical springs were disposed beneath the frame members. Thus, it will appear that the novel disposition of the springs 34, 35 permits the seats 39 to be moved backwardly a considerable distance which is highly desirable to secure greater riding comfort by increased leg space.

Inside the helical springs 34 shock absorbers 36 of the telescope type may be disposed.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle, the combination comprising a vehicle body, a bracket attached thereto, a pair of half axles hinged to said bracket only for oscillation about a substantially horizontal axis extending lengthwise of the vehicle, wheels journalled on said half axles, each of said half axles being provided with engagement means, and springing means interposed between said body and each of said half axles and engaging said engagement means at a supporting point, said supporting point being substantially located in a vertical plane extending through the center of the associated one of said wheels and through said bracket, said plane extending at an acute angle to a vertical transverse plane of said vehicle.

2. In a vehicle, the combination comprising a vehicle body, a bracket attached thereto, a substantially horizontal pivot pin extending lengthwise of the vehicle, resilient means for mounting one end of said pivot pin on said bracket, a pair of half axles pivotally mounted on said pin only for oscillation, wheels journalled on said half axles, each of said half axles being provided with engagement means, and springing means interposed between said body and each of said half axles and engaging said engagement means at a supporting point, said supporting point being substantially located in a vertical plane extending through the center of the associated one of said wheels and through said resilient means, said plane extending at an acute angle to a vertical transverse plane of said vehicle.

3. The combination as claimed in claim 1 in which said springing means comprises a link pivotally connected to one of said half axles at said supporting point and extending forwardly therefrom and having its forward end pivotally connected to said body, and a helical spring interposed between said link and said body.

4. The combination as claimed in claim 2 in which each of said half axles is formed with a forwardly and downwardly extending projection, said springing means comprising a link having its rear end pivotally connected to said projection at said supporting point and extending forwardly therefrom and having its forward end pivotally connected to said body, and a helical spring interposed between said link and said body, said link serving the purpose of guiding said half axle in its up-and-down movement relative to said body.

5. The combination as claimed in claim 4 in which said body is provided with lower lateral longitudinal frame members, said helical springs being disposed adjacent to the opposed inside faces of said frame members.

6. In a vehicle, the combination comprising a vehicle body provided with lower lateral longitudinal frame members, a bracket attached to said body and extending downwardly therefrom intermediate said members, a substantially horizontal pivot pin extending lengthwise of the vehicle, a resilient bushing for mounting the forward end of said pin in said bracket, a pair of half axles pivotally mounted for oscillation on said pivot pin only behind said bracket and formed with forwardly and downwardly extending projections, wheels journalled on said half axles, a pair of guiding links, each link having its rear end pivotally connected to said projection at a supporting point and extending forwardly therefrom and having its forward end pivotally connected to said body, and helical springs interposed between said links and said body adjacent to the opposed inside faces of said frame members, said supporting points being substantially located in vertical planes extending through the centers of said wheels and said bushing.

7. The combination as claimed in claim 1 in which one of said half axles includes a differential gear housing hinged to said bracket, said combination further comprising means encased in said half axles and connected to said wheels for driving the same, said means including shafts disposed coaxially with respect to said half axles and a universal joint connecting said shafts and a differential gearing disposed within said housing, said joint being located substantially above said horizontal axis.

References Cited in the file of this patent

UNITED STATES PATENTS

| | | |
|---|---|---|
| 1,937,653 | Haltenberger | Dec. 5, 1933 |
| 2,055,975 | Haltenberger | Sept. 29, 1936 |
| 2,300,844 | Olley | Nov. 3, 1942 |
| 2,681,118 | Roller | June 15, 1954 |